Sept. 25, 1962 W. M. BARKER ET AL 3,056,068
LIGHTNING PROTECTION APPARATUS FOR COMMUNICATION SYSTEMS
Filed April 6, 1959
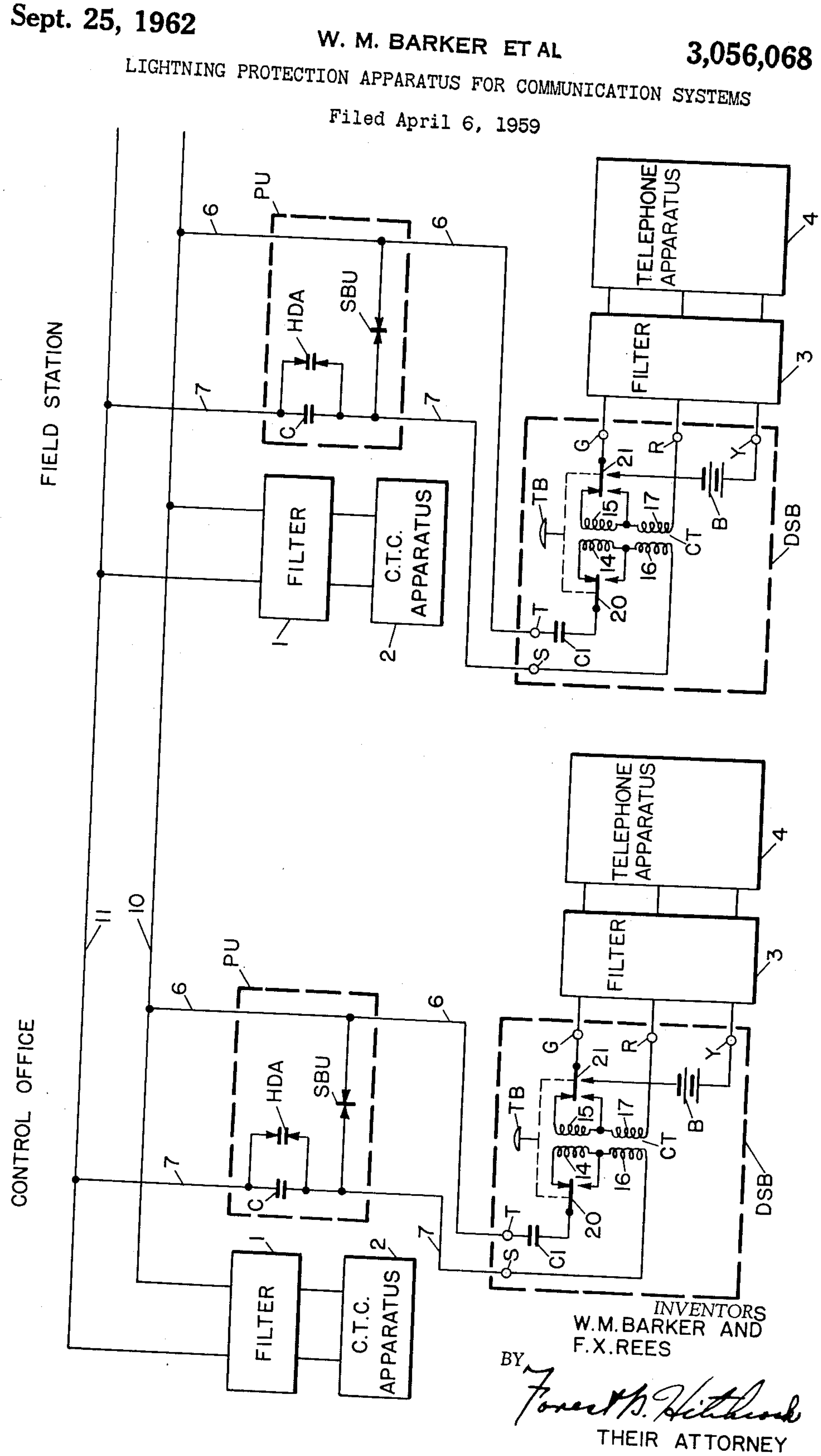
INVENTORS
W.M.BARKER AND
F.X.REES
BY Forest B. Hitchcock
THEIR ATTORNEY United States Patent Office 3,056,068

Patented Sept. 25, 1962

3,056,068

LIGHTNING PROTECTION APPARATUS FOR COMMUNICATION SYSTEMS

William M. Barker, Scottsville, and Frank X. Rees, Chili, N.Y., assignors to General Railway Signal Company, Rochester, N.Y.

Filed Apr. 6, 1959, Ser. No. 804,524
2 Claims. (Cl. 317—61)

This invention relates in general to apparatus used in connection with a centralized traffic control system having a set of line wires in common with a telephone system, and more particularly pertains to lightning protection apparatus for such communication systems.

The usual centralized traffic control system employs direct current applied to a line circuit at the central office in the form of code pulses to transmit information to any one of a plurality of field stations. It is also desirable to provide telephonic communication over the same line wires as employed for the line circuit of the centralized traffic control system. This is usually accomplished by inductively coupling the telephone circuits to the line circuit in a manner that the direct current pulses of the CTC system do not interfere with the telephone communication.

Since the telephone apparatus is usually of the low voltage type which will not withstand more than approximately six hundred volts, it is necessary to provide suitable lightning protection which will protect it against damage. But the usual lightning protection provided for such telephone apparatus is not effective to extinguish the follow through direct current incident to a lightning discharge.

Thus, one object of the present invention can be said to be the provision of an organization for protecting telephone apparatus from lightning discharges when it is employed in connection with a centralized traffic control system using relatively high direct current voltages.

Another object of the present invention is the provision of a protective organization of elements, the employment of which will permit alternating-current and direct-current apparatus to be operated concurrently without interference one from the other while being connected to a common line circuit.

Other objects, purposes and characteristic features of the present invention will be in part obvious from the accompanying drawing, and in part pointed out as the description of the invention progresses.

The single sheet of drawing shows a centralized traffic control system combined with a telephone communication system with the lightning protective apparatus of the present invention applied thereto.

In general, the accompanying drawing shows a centralized traffic control system line circuit comprising line wires 10 and 11 as connecting a control office and a plurality of field stations (only one shown). The CTC apparatus 2 at the control office and at each field staton is connected to the line circuit through a suitable filter 1. Such filter 1 permits the passage of direct current pulses but does not permit frequencies associated with the telephone system to pass to the CTC apparatus. A typical centralized traffic control system is shown, for example, in the patent to W. D. Hailes et al., Patent No. 2,399,734, granted on May 7, 1946.

The telephone apparatus 4 at the control office and at each field station is connected through a filter 3, the desk set box DSB, and a protective unit PU over wires 6 and 7 to the line wires 10 and 11.

Normally each telephone apparatus is in condition to receive voice communication over the line circuit from any other station. Whenever it is desired to transmit from a particular station, the person desiring to so transmit actuates the button TB to disconnect the windings 14 and 15 of the transformer CT from the circuit and directly connect windings 16 and 17 across the terminals G and R of the desk set DSB. This is accomplished by contacts 20 and 21. Contact 21 additionally connects the battery B across the terminals G and Y to render the telephone apparatus 4 operative for transmission of voice messages. This is a typical telephone type communication system which may be found in the Manual of the Association of American Railroads in the communication section 2–J–37 on page 26. This publication was issued in June 1940 by the A.A.R. of 59 East Van Buren Street, Chicago 5, Illinois.

More specifically, a protective unit PU at the control office and at each of the field stations comprises a surge by-pass unit SBU connected between the lead wires 6 and 7 to protect the telephone apparatus from lightning or static discharge voltages. This by-pass unit SBU may be of any suitable low voltage protective device such as, for example, disclosed in the pending application of F. X. Rees, Ser. No. 747,745, filed on July 10, 1958, now abandoned, and in the pending application of F. X. Rees, Ser. No. 44,832, filed on July 21, 1960, which is a continuation-in-part of the now abandoned application Ser. No. 747,745. Such a low voltage protective device preferably breaks down for voltages in the order of one hundred volts to protect the low voltage telephone equipment which will in most instances withstand voltages up to approximately six hundred volts. It is, of course, to be understood that these voltages are merely given as typical and that other relative values may be involved in actual practice.

It should be noted that the low voltage protective device SBU has two characteristics which must be compensated for in the organization disclosed. In the first instance, it is of a shunt type device which may allow small leakage currents, and it would be undesirable to have such a shunt directly across the line wires 10 and 11 in the presence of a relatively high direct current voltage in the order of two hundred volts. In the second place, should a lightning or static discharge occur across the device SBU with it connected directly across line wires 10 and 11, then the device would permit a follow through direct current. It is for these reasons that a relatively large capacitor C is placed in series in the lead wire 7.

However, the capacitor C has a limit to which it may withstand high voltages, and if this limit is in the order of two thousand volts then it is desirable to have a heavy duty arrestor HDA connected across it which will discharge in the presence of voltages in the order of one thousand volts. Such a heavy duty arrestor HDA may be of any suitable type, but one suitable type has been found to be such as the arrestor shown in the Patent No. 2,923,849, granted to F. X. Rees on February 2, 1960. Here again, the relative voltages involved will be dependent upon the design and size of the capacitor C and the heavy duty arrestor HDA.

With such a protective unit PU, it will be apparent that the occurrence of a relatively high voltage induced in the line wires 10 and 11 will be properly handled in a manner to protect the telephone apparatus and yet allow continued operation of the centralized traffic control system.

Let us assume that a voltage of something over one thousand volts is induced in the line wire 11. As such voltage rises toward a peak value, it of course begins to charge the condenser C. When the voltage rise is at or slightly above the breakdown point of the by-pass unit SBU, such unit allows the charging current to flow directly from wire 7 to wire 6 and to wire 10. As the voltage between wires 10 and 11 continues to rise any charging current of the capacitor C is directly passed from wire 7 to the wire 6 through the unit SBU without harming the telephone apparatus 4. When the voltage across capacitor C has risen to the critical or breakdown point of the heavy duty arrestor HDA, such as at one thousand volts, then such arrestor breaks down and the voltage between wires 11 and 10 is equalized. As soon as the heavy duty arrestor HDA breaks down, the voltage across capacitor C of course ceases to rise and the capacitor unit C is thus protected at a value below that voltage which it will withstand. In this way, a relatively high static discharge producing a voltage drop between the line wires 10 and 11 may be readily dissipated without damage to any of the apparatus.

If the induced static surge is below a value which will cause the discharge of the heavy duty arrestor HDA, it is readily apparent that the voltage thus produced above any critical breakdown voltage of the surge by-pass unit SBU will be dissipated to the other line wire without harming the telephone apparatus 4. This is because the surge in passing through the capacitor C is bypassed to the other wire 6 or 7 as soon as the potential rises above the critical or breakdown point of the by-pass unit SBU.

In this way it can be seen that the telephone apparatus is provided protection against any voltage which may be greater than the critical breakdown voltage of the bypass unit SBU. When the induced voltage on the line is of a value less than that which will cause the breakdown of the heavy duty arrestor HDA, it is evident that the capacitor C acts to prevent the flow of direct current that would be incident to the breakdown of the bypass unit SBU if such capacitor C were not present.

On the other hand, in the instance where the induced voltage on the line is above the breakdown point for the heavy duty arrestor HDA, it is evident that during its discharge direct current accompanies such discharge; but the capacitor C acts in cooperation with the heavy duty arrestor HDA and the inductance inherent in the local circuit to swing to a negative value which effects the extinguishment of the heavy duty arrestor discharge. Such action may take place one or more times dependent upon the duration of the induced surge in the line. Thus, it is apparent that once the discharge of the heavy duty arrestor HDA has been extinguished, there is no follow-through direct current after the discharge. Any direct current that passes through the heavy duty arrestor HDA during a discharge is passed through the bypass unit SBU, but this is not objectionable since such direct current is interrupted by the cooperation of the capacitor C and the heavy duty arrestor HDA. In brief, the ability of the heavy duty arrestor HDA to interrupt direct current is greatly increased by the capacitor C.

It is of course to be understood that the protective unit PU at the control office and at each of the field stations acts in exactly the same way to protect the associated telephone apparatus from damage due to lightning or static discharges. Also, it should be understood that suitable protective apparatus is associated with the CTC apparatus, but this has not been shown for the sake of simplicity in the disclosure.

Having described lightning protection apparatus for communication systems as one specific embodiment of the present invention, it is desired to be understood that this form is selected to facilitate in the disclosure of the invention rather than to limit the number of forms which it may assume, and, it is to be further understood that various modifications, adaptations and alterations may be applied to the specific form shown to meet the requirements of practice without in any manner departing from the spirit or scope of the present invention.

What we claim is:

1. In a communication system having a line circuit electrically connected to normally transmit concurrently at times pulses of direct current energy and alternating current energy for effecting selective control of respective apparatuses each operatively connected by two connecting wires to the line circuit where the alternating current operated apparatus is damageable by an abnormal voltage surge appearing on the line circuit, a surge protective device electrically connected across said two connecting wires at the location of said alternating current operated apparatus and having a leakage current path for permitting a low voltage breakdown thereof at a predetermined level, said device normally having a high resistance in relation to the low resistance of said alternating current operated apparatus for permitting desired operation thereof by said alternating current energy during normal operating conditions but being responsive to said abnormal voltage surge for causing the high resistance thereof to be reduced to substantialy zero resistance when the current flowing through said leakage path increases sufficiently to cause a discharge to occur so as to equalize the potentials appearing on said two connecting wires, a capacitor type blocking means electrically connected in one of said two connecting wires for preventing said direct current voltage from being applied across said device and having surge protecting characteristics permitting only a limited voltage surge to be applied thereto, and a discharge device electrically connected in said one of said two connecting wires and in shunt with said blocking means and having an airgap through which said abnormal voltage surge including at least said limited voltage surge is passed.

2. The system according to claim 1, wherein said alternating current operated apparatus is electrically connected to said two connecting wires and to said line circuit through a transformer means having a primary winding with low resistance and a secondary winding, said alternating current energy being attenuated by only the resistance of said line circuit, said two connecting wires and the included reactive components but being applied to said primary winding during normal operating conditions at substantially the same level as is applied originally to said line circuit, said surge protecting device, said blocking device and said discharge device being electrically connected in said two connecting wires on said primary winding side of said transformer means, said abnormal voltage surge appearing on said line circuit being applied to said surge protective device and said primary winding jointly with said increasing current flow through said device tending to limit the amount of current flowing through said primary winding until said predetermined breakdown level of said device is reached to cause the resistance of said device to be reduced to substantially zero with the current flow produced by said surge being dissipated across said device and the current flowing through said primary winding being reduced to substantially zero.

References Cited in the file of this patent

UNITED STATES PATENTS

| | | |
|---|---|---|
| 2,789,254 | Bodle | Apr. 16, 1957 |
| 2,803,771 | Moore | Aug. 20, 1957 |

FOREIGN PATENTS

| | | |
|---|---|---|
| 578,609 | Great Britain | July 4, 1946 |